United States Patent
Umezawa et al.

(10) Patent No.: US 9,642,349 B2
(45) Date of Patent: May 9, 2017

(54) FISHING REEL

(71) Applicant: GLOBERIDE, INC., Higashikurume-shi (JP)

(72) Inventors: Yuuichi Umezawa, Higashikurume (JP); Shuta Kano, Higashikurume (JP)

(73) Assignee: GLOBERIDE, INC., Higashikurume-shi (JP)

( * ) Notice: Subject to any disclaimer, the term of this patent is extended or adjusted under 35 U.S.C. 154(b) by 0 days.

(21) Appl. No.: 14/666,367

(22) Filed: Mar. 24, 2015

(65) Prior Publication Data

US 2015/0189865 A1 Jul. 9, 2015

Related U.S. Application Data

(63) Continuation of application No. PCT/JP2013/081160, filed on Nov. 19, 2013.

(30) Foreign Application Priority Data

Nov. 29, 2012 (JP) ................................. 2012-260550

(51) Int. Cl.
*A01K 89/01* (2006.01)
*A01K 89/015* (2006.01)

(52) U.S. Cl.
CPC ...... *A01K 89/015* (2013.01); *A01K 89/01917* (2015.05); *A01K 89/01918* (2015.05)

(58) Field of Classification Search
CPC .............. A01K 89/015; A01K 89/0189; A01K 89/0191; A01K 89/019125;

(Continued)

(56) References Cited

U.S. PATENT DOCUMENTS 2,057,178 A * 10/1936 Balz ................... A01K 89/0155
    242/279
2,160,175 A * 5/1939 Shakespeare, Jr. .. A01K 89/015
    242/279

(Continued)

FOREIGN PATENT DOCUMENTS

CN         1193455 A      9/1998
CN       201345861 Y     11/2009

(Continued)

OTHER PUBLICATIONS

International Search Report issued Feb. 25, 2014 for PCT/JP2013/081160 filed on Nov. 19, 2013 in English.

(Continued)

*Primary Examiner* — Emmanuel M Marcelo
(74) *Attorney, Agent, or Firm* — Oblon, McClelland, Maier & Neustadt, L.L.P.

(57) ABSTRACT

A fishing reel includes a fishing line threading section (60A) through which a fishing line to be unreeled from a spool (5A) is threaded, a main body (60B) that is engaged with a worm shaft (51) provided between left and right side plates, a fishing line guide body (60) that reciprocates between the left and right side plates through the rotational drive of the worm shaft, and a clutch mechanism (20) that switches the spool (5A) between a fishing line winding state and a fishing line unwinding state. The fishing line guide body (60) is supported in front of the spool (5A) so as to be switched and movable between the fishing line unwinding state and the fishing line winding state, and the fishing line threading section (60A) and the main body (60B) are formed separately and integrated with each other.

5 Claims, 15 Drawing Sheets

(58) Field of Classification Search
CPC ........ A01K 89/01915; A01K 89/01916; A01K 89/01917; A01K 89/01918
See application file for complete search history.

(56) References Cited

U.S. PATENT DOCUMENTS

| | | | | |
|---|---|---|---|---|
| 2,564,603 | A * | 8/1951 | Jaskey | A01K 89/015 242/269 |
| 2,652,212 | A * | 9/1953 | Holahan, Jr. | A01K 89/015 140/3 R |
| 3,111,287 | A | 11/1963 | Baenziger | |
| 3,171,609 | A * | 3/1965 | Baenziger | A01K 89/015 242/260 |
| 3,237,900 | A * | 3/1966 | Odom | A01K 89/015 242/157 R |
| 3,429,521 | A * | 2/1969 | Jones | A01K 89/015 192/41 R |
| 4,575,024 | A * | 3/1986 | Kaneko | A01K 89/015 242/261 |
| 4,580,741 | A * | 4/1986 | Murakami | A01K 89/015 242/280 |
| 5,246,187 | A * | 9/1993 | Noda | A01K 89/015 242/261 |
| 5,855,330 | A * | 1/1999 | Kobayashi | A01K 89/015 242/261 |
| 6,053,444 | A * | 4/2000 | Yamaguchi | A01K 89/015 242/275 |
| 6,460,793 | B1 * | 10/2002 | Hirayama | A01K 89/015 242/313 |
| 6,464,158 | B1 * | 10/2002 | Sakurai | A01K 89/006 242/283 |
| 6,830,209 | B1 * | 12/2004 | Baenziger | A01K 89/015 242/278 |
| 7,077,351 | B2 | 7/2006 | Myojo et al. | |
| 8,714,470 | B2 | 5/2014 | Toma | |
| 2004/0075005 | A1 | 4/2004 | Myojo et al. | |
| 2006/0006267 | A1 * | 1/2006 | Hirayama | A01K 89/015 242/223 |
| 2009/0250541 | A1 | 10/2009 | Tsutsumi | |
| 2012/0104135 | A1 * | 5/2012 | Toma | A01K 89/015 242/227 |
| 2014/0183292 | A1 * | 7/2014 | Kaneko | A01K 89/0108 242/234 |

FOREIGN PATENT DOCUMENTS

| | | |
|---|---|---|
| CN | 102428901 A | 5/2012 |
| EP | 0 865 730 A2 | 9/1998 |
| JP | H11-89487 A | 4/1999 |
| JP | 11-266757 | 10/1999 |
| JP | H11-308951 A | 11/1999 |
| JP | 2009-38978 A | 2/2009 |
| JP | 2012-70683 A | 4/2012 |
| KR | 10-2006-0101183 A | 9/2006 |

OTHER PUBLICATIONS

Notice of Reasons for Refusal issued Feb. 12, 2016 in Japanese Patent Application No. 2012-260550 (with English language translation).
Combined Office Action and Search Report issued Nov. 24, 2015 in Chinese Patent Application No. 201380053844.6 (with English language translation and English translation of Categories of Cited Documents).
Extended European Search Report issued in Patent Application No. EP 13 858 026.1 on Jun. 10, 2016.
Chinese Office Action issued in Patent Application No. CN 201380053844.6 on Jun. 15, 2016 (w/ English Translation).
Chinese Office Action issued in Application No. 201380053844.6 on Nov. 18, 2016 (w/ English translation).

* cited by examiner

FISHING REEL

TECHNICAL FIELD

The present invention relates to a fishing reel including a fishing line guide body that guides and winds a fishing line on a spool in parallel and is provided between side plates in front of the spool.

BACKGROUND ART

In the related art, a double-bearing fishing reel is provided with a level wind device so as to uniformly wind a fishing line on a spool that is rotatably supported between left and right side plates. The level wind device includes a worm shaft that is rotated in front of the spool in conjunction with a winding operation of a handle rotatably provided on one side plate, and a fishing line guide body that is engaged with the worm shaft and reciprocates in a left and right direction. Accordingly, when the fishing line is threaded through a fishing line threading section of the fishing line guide body, the fishing line can be wound on the spool in parallel.

Incidentally, the above-mentioned fishing line guide body has a problem in that, for example, a flying distance of a terminal tackle may be shortened since resistance is generated due to the contact between a fishing line and the fishing line guide body when the terminal tackle is cast. Further, when the fishing line is wound on the spool, the displacement of the fishing line needs to be prevented at the fishing line guide body so that a stable spooled condition can be ensured. Accordingly, for example, Patent Document 1 discloses a structure in which an upper portion of a fishing line guide section of a fishing line guide body is long in a left and right direction and a lower middle portion thereof forms a narrow groove for guiding a fishing line. The upper portion of the fishing line guide section forms a fishing line threading section (a wide opening portion) during the unwinding of the fishing line, and the lower portion of the fishing line guide section forms a guide portion during the winding of the fishing line. Further, a pillar, which can move in a vertical direction in conjunction with an operation for switching a clutch, is provided in the vicinity of the fishing line guide body in a front and rear direction. Accordingly, when the fishing line is unwound (when the clutch is turned off), the pillar is moved up and the fishing line is positioned at the fishing line threading section. As a result, resistance against a line is reduced. When the fishing line is wound (when the clutch is turned on), the pillar is moved down and the fishing line is guided to the narrow groove. As a result, a spooled condition in which the fishing line is wound on the spool is improved.

CITATION LIST

Patent Document

Patent Document 1: JP 2012-70683 A

DISCLOSURE OF THE INVENTION

Problem to be Solved by the Invention

The structure of the fishing line guide body is important to reduce unwinding resistance applied to the fishing line during the unwinding of the fishing line and to stably wind the fishing line as described above. Accordingly, the fishing line guide body having these complex functions has room for reduction in cost and improvement. Particularly, in regard to the fishing line guide body, these are various user's preferences for the fishing line guide body, such as a fishing line guide body for a thick line, a fishing line guide body for a thin line, a fishing line guide body placing an emphasis on sliding balance, a fishing line guide body placing an emphasis on a spooled shape, and a fishing line guide body allowing weight to be reduced as a whole, in accordance with object fishes, fishing methods, and the like. In this case, the manufacture of various kinds of fishing reels including fishing line guide bodies (fishing line threading sections), which are preferred by users, causes cost to be increased for manufacturers and users.

The invention has been made while focusing on the above-mentioned problems, and an object of the invention is to provide a fishing reel including a fishing line guide body that can be replaced at low cost, allow unwinding resistance to be reduced, and stably wind a fishing line.

Means for Solving Problem

To achieve the above-mentioned object, a fishing reel according to the invention includes a spool, a fishing line guide body, and a clutch mechanism. The spool is rotatably supported between left and right side plates of a reel body. The fishing line guide body includes a fishing line threading section through which a fishing line to be unreeled from the spool is threaded and a main body that is engaged with a worm shaft provided between the left and right side plates. The fishing line guide body reciprocates between the left and right side plates through the rotational drive of the worm shaft. The clutch mechanism switches the spool between a fishing line winding state and a fishing line unwinding state. The fishing line guide body is supported in front of the spool so as to be switched and movable between the fishing line unwinding state and the fishing line winding state, and the fishing line threading section and the main body are formed separately and integrated with each other.

According to the fishing reel having the above-mentioned structure, the fishing line threading section and the main body of the fishing line guide body are formed separately and integrated with each other. Accordingly, for example, the fishing line threading section is made of a hard material that allows resistance against the fishing line to be reduced, and the main body is made of a resin material that allows weight to be reduced. That is, different materials can be effectively used as the material of the fishing line guide body. Therefore, the fishing line guide body can be reduced in cost and can be reduced in weight as a whole. Further, the fishing line guide body is supported in front of the spool so as to be switched and movable between the fishing line unwinding state and the fishing line winding state. Accordingly, the fishing line guide body can be switched to a position, where unwinding resistance applied to the fishing line is small, in the fishing line unwinding state, and can be switched to a position, where the fishing line can be stably guided to the spool, in the fishing line winding state.

Meanwhile, the fishing line threading section and the main body, which are formed separately and integrated with each other, may be detachably integrated with each other by using a fixing member, such as a screw, the press-fitting, elastic deformation means of the fishing line threading section and the main body, or the like. Since the fishing line threading section and the main body are adapted to be attached to and detached from each other, it is possible to easily replace only the fishing line threading section in accordance with repair, the kind of the line, and the use.

Further, to achieve the above-mentioned object, a fishing reel according to the invention includes a spool, a fishing line guide body, and a clutch mechanism. The spool is rotatably supported between left and right side plates of a reel body. The fishing line guide body includes a fishing line threading section through which a fishing line to be unreeled from the spool is threaded and a main body that is engaged with a worm shaft provided between the left and right side plates. The fishing line guide body reciprocates between the left and right side plates through the rotational drive of the worm shaft. The clutch mechanism switches the spool between a fishing line winding state and a fishing line unwinding state. The fishing line threading section is detachably integrated with the main body. The fishing line threading section includes a fishing line guide section that guides the fishing line to the spool in the fishing line winding state and is narrow in a left and right direction, and an opening portion that reduces unwinding resistance applied to the fishing line in the fishing line unwinding state and is wide in the left and right direction. The reel body is provided with a contact member that moves so as to prevent the fishing line from deviating from the fishing line guide section by coming into contact with the fishing line when the clutch mechanism is turned on.

According to the fishing reel having the above-mentioned structure, the fishing line threading section and the main body of the fishing line guide body are detachably integrated with each other. Accordingly, for example, the fishing line threading section is made of a hard material that allows resistance against the fishing line to be reduced, and the main body is made of a resin material that allows weight to be reduced. That is, different materials can be effectively used as the material of the fishing line guide body. Therefore, the fishing line guide body can be reduced in cost and can be reduced in weight as a whole. Further, since the fishing line threading section and the main body are detachably integrated with each other, it is possible to easily replace only the fishing line threading section in accordance with repair, the kind of the line, and the use. Furthermore, the fishing line threading section includes the fishing line guide section that guides the fishing line to the spool in the fishing line winding state and is narrow in a left and right direction, and an opening portion that reduces unwinding resistance applied to the fishing line in the fishing line unwinding state and is wide in the left and right direction; and the reel body is provided with the contact member that moves so as to prevent the fishing line from deviating from the fishing line guide section by coming into contact with the fishing line when the clutch mechanism is turned on. Accordingly, the fishing line is positioned at the wide opening portion in the fishing line unwinding state, so that unwinding resistance is reduced; and the fishing line is positioned at the narrow fishing line guide section in the fishing line winding state, so that the fishing line is stably wound on the spool.

Effect of the Invention

According to the invention, there is provided a fishing reel including a fishing line guide body that can be replaced at low cost, allow unwinding resistance to be reduced, and stably wind a fishing line.

MODE(S) FOR CARRYING OUT THE INVENTION

A fishing reel according to the invention will be described below with reference to the drawings.

Figure 1:
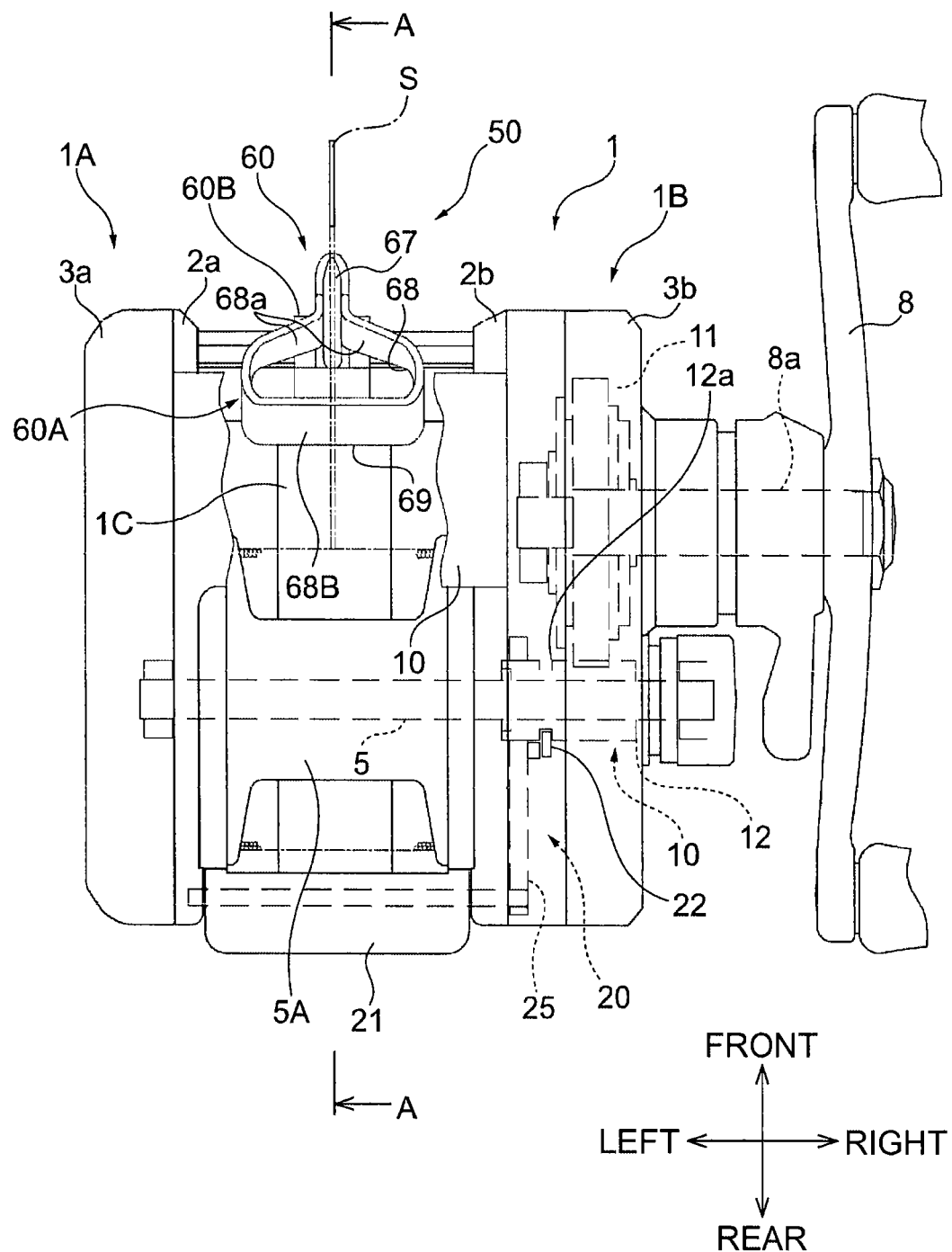
FIG. 1 is a plan view illustrating a fishing reel according to a first embodiment of the invention, in which a fishing line guide body is exposed.
Figure 2:
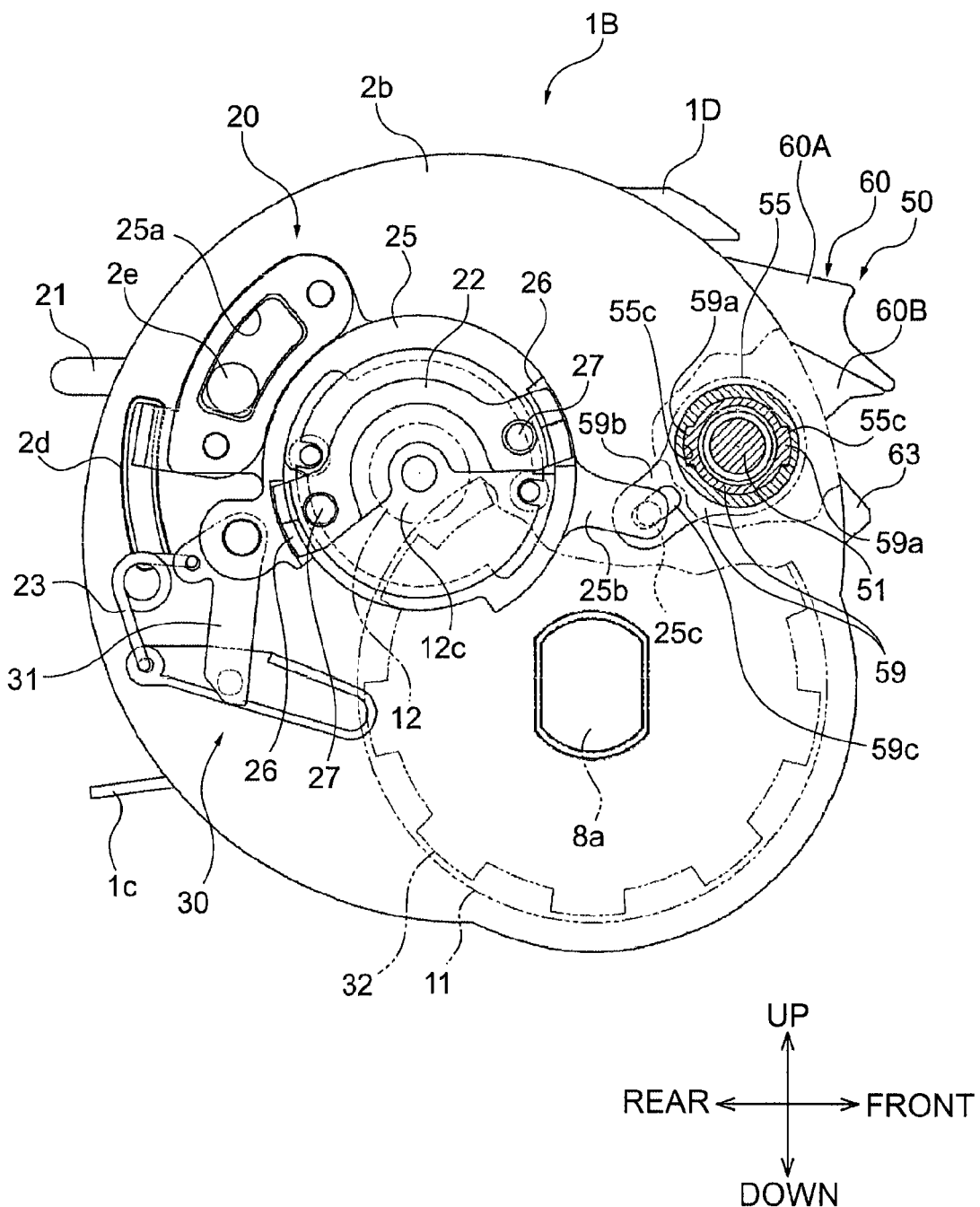
FIG. 2 is a side view illustrating the structure of a power transmitting portion of a clutch mechanism in the fishing reel illustrated in FIG. 1 (clutch ON state)
Figure 3:
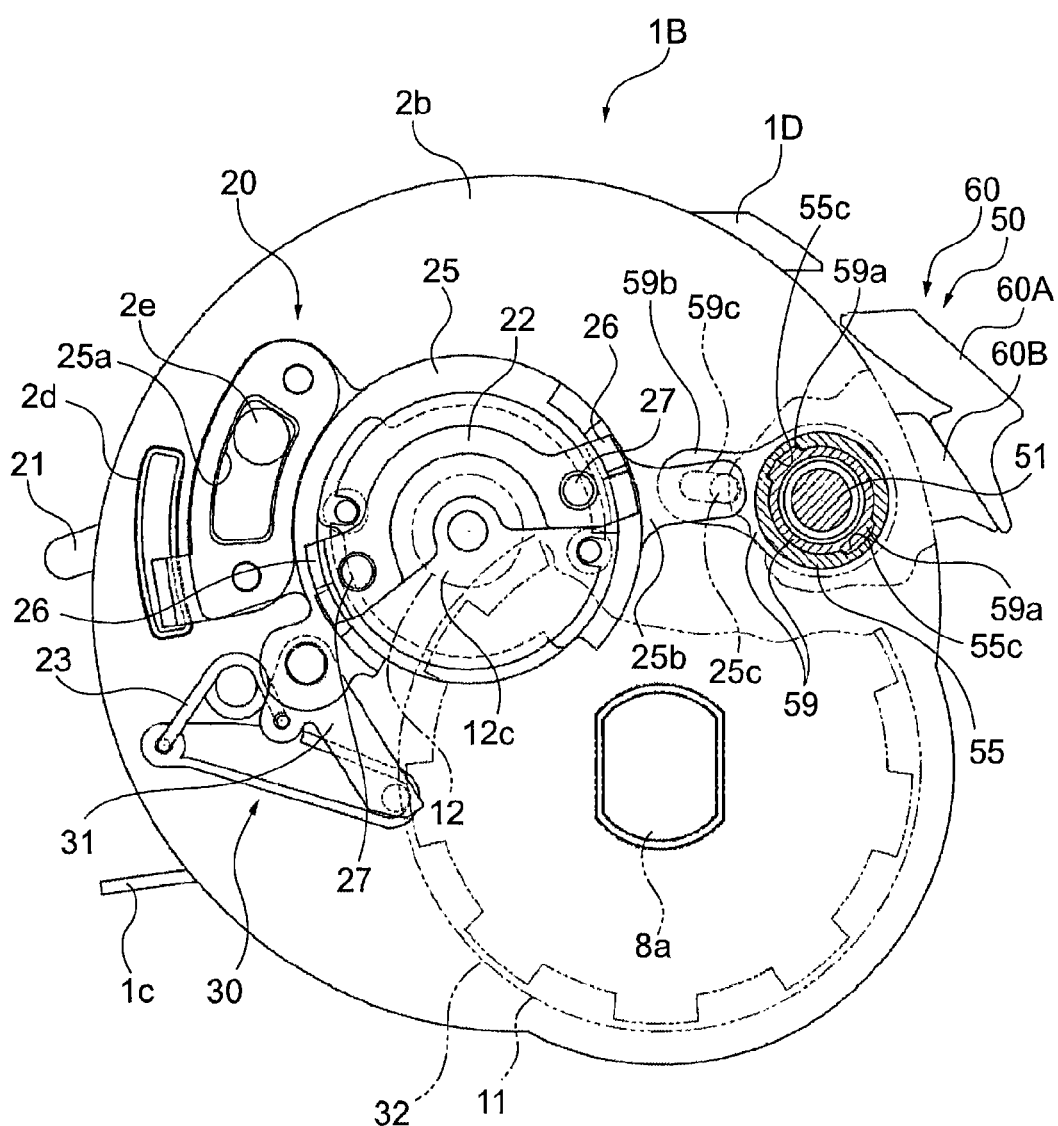
FIG. 3 is another side view illustrating the structure of the power transmitting portion of the clutch mechanism in the fishing reel illustrated in FIG. 1 (clutch OFF state)

FIGS. 1 to 3 are diagrams illustrating a fishing reel according to a first embodiment of the invention. FIG. 1 is a plan view in which a fishing line guide body is exposed, FIG. 2 is a side view illustrating the structure of a power transmitting portion of a clutch mechanism (clutch ON state), and FIG. 3 is another side view illustrating the structure of the power transmitting portion of the clutch mechanism (clutch OFF state). Meanwhile, in the following description, a front and rear direction, a left and right direction, and a vertical direction are defined as directions that are illustrated in FIGS. 1 and 2.

The fishing reel according to this embodiment includes a reel body 1 provided with left and right side plates 1A and 1B of which left and right frames 2a and 2b are covered with left and right covers 3a and 3b. A reel leg 1C, which is positioned between the left and right side plates and is mounted on a fishing rod (not illustrated), is formed integrally with the reel body. Further, a spool shaft 5 is rotatably supported via a bearing between the left and right frames 2a and 2b, and a spool 5A on which a fishing line is wound is integrally fixed to the spool shaft 5. Furthermore, a thumb rest 1D on which a finger can be placed is provided between the left and right side plates on the upper side of the spool 5A.

In this embodiment, a handle 8 for rotationally driving the spool 5A is mounted on the right side plate 1B. A known power transmission mechanism 10, which transmits a rotational driving force of the handle 8 to the spool shaft 5, is provided in a space between the right frame 2b and the right cover 3b. Further, a known clutch mechanism 20, which switches the spool shaft 5 between a power transmitting state and a power cut-off state, is provided between the right frame 2b and the right cover 3b. The clutch mechanism 20 is adapted to be switched to a clutch OFF state (the power cut-off state, also a fishing line unwinding state) from a clutch ON state (the power transmitting state, also a fishing line winding state) by pushing down a clutch switching operation member (hereinafter, referred to as an operation member) 21 provided between the left and right side plates in the rear of the spool 5A. Incidentally, returning to the clutch ON state from the clutch OFF state can be achieved by rotating the handle 8, using an automatic return mechanism 30 to be described below.

Further, a level wind device 50 is provided between the left and right side plates 1A and 1B on the fishing line unreeled-direction side of the spool 5A. The level wind device 50 is adapted to allow a fishing line guide body 60, through which the fishing line is threaded, to reciprocate in the left and right direction by rotating the handle 8. Accordingly, the level wind device 50 has a function to uniformly wind the fishing line on the spool 5A while spooling the fishing line. In this case, as described below, the fishing line guide body 60 includes a portion through which a fishing line is actually threaded (fishing line threading section 60A) and a main body (holding section) 60B that is engaged with a worm shaft (screw shaft) forming the level wind device. In detail, a slidable member (engagement pin) provided on the main body 60B is engaged with the worm shaft, so that the main body 60B is reciprocated in the left and right direction.

The drive force transmission mechanism 10 includes a drive gear 11 associated with a drag mechanism, and a pinion 12 to be engaged with the drive gear 11. The drive gear 11 is rotatably mounted on a handle shaft 8a to which the handle 8 is fixed. The pinion 12 is disposed coaxially with the spool shaft 5, and is movable along the spool shaft 5 (which may be a separate spool shaft) in the axial direction. Further, a circumferential groove 12a is formed on an outer periphery of the pinion 12 and the circumferential groove 12a is engaged with a yoke 22 of the clutch mechanism 20 to be described below, so that the pinion 12 is moved in the axial direction. That is, when the pinion 12 is moved in the axial direction, the pinion 12 is engaged with or disengaged from the spool shaft 5. As a result, the clutch mechanism is switched to the power transmitting state (clutch ON) or the power cut-off state (clutch OFF).

The clutch mechanism 20 includes a clutch plate 25. The clutch plate 25 is supported so as to be rotatable relative to the right frame 2b, and is switched and held between the power transmitting state (clutch ON state) illustrated in FIG. 2 and the power cut-off state (clutch OFF state) illustrated in FIG. 3 by a switching spring 23. The clutch plate 25 is connected to the operation member 21 via a connecting hole 2d, which is formed vertically on the right frame 2b, and a pin 2e, which is formed on the right frame 2b so as to protrude, is inserted into a long hole 25a formed on the clutch plate 25. Accordingly, the rotational drive of the clutch plate 25 is guided.

A pair of cam faces 26, which can be engaged with the yoke 22 engaged with the circumferential groove 12a of the pinion 12, is formed on the surface of the clutch plate 25. Tip sides of the yoke 22 are held by support pins 27 protruding from the right frame 2b, and the yoke 22 is continuously biased to the clutch plate 25 side by a spring member (not illustrated) mounted on each support pin. Meanwhile, FIG. 2 illustrates a state in which the yoke 22 is biased to the clutch plate 25 side by the spring member. At this point, the pinion 12 is engaged with an engagement section formed at the end portion of the spool shaft, so that the clutch mechanism is in the clutch ON state.

When the operation member 21 is pushed down in a direction indicated by an arrow of FIG. 2, the clutch plate 25 is rotated counterclockwise and disengages the pinion 12 from the engagement section, which is formed at the end portion of the spool shaft, via the cam face 26 and the yoke 22. Accordingly, the clutch mechanism is switched to the clutch OFF state as illustrated in FIG. 3. Meanwhile, this state is maintained by the switching spring 23.

Further, the clutch plate 25 is provided with the automatic return mechanism 30 that switches the clutch to the ON state from the OFF state. The automatic return mechanism 30 includes a kick member 31 that is formed integrally with the clutch plate, and a ratchet 32 that is unrotatably fixed to the handle shaft 8a. The kick member 31 is arranged and adapted so as to enter the inside of a rotating locus of the ratchet 32 as illustrated in FIG. 3 when the clutch mechanism is switched to the OFF state from the ON state. Accordingly, when the handle 8 is operated for winding in the clutch OFF state, the kick member 31 is kicked by the rotation of the ratchet 32 and the clutch plate 25 is automatically returned to the position of the clutch ON state and is held by the spring force of the switching spring 23. Meanwhile, the return of the clutch can also be performed by pushing up the operation member 21.

Figure 4:
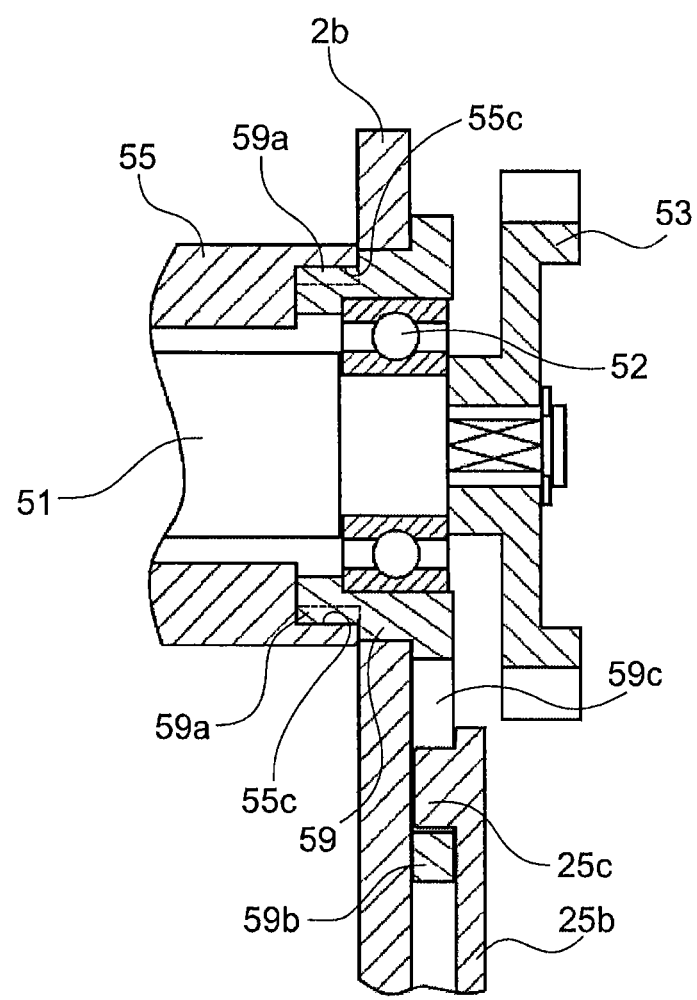
FIG. 4 is a cross-sectional view illustrating the structure of a connected portion between a clutch plate and a rotary plate that rotates the fishing line guide body.
Figure 5:
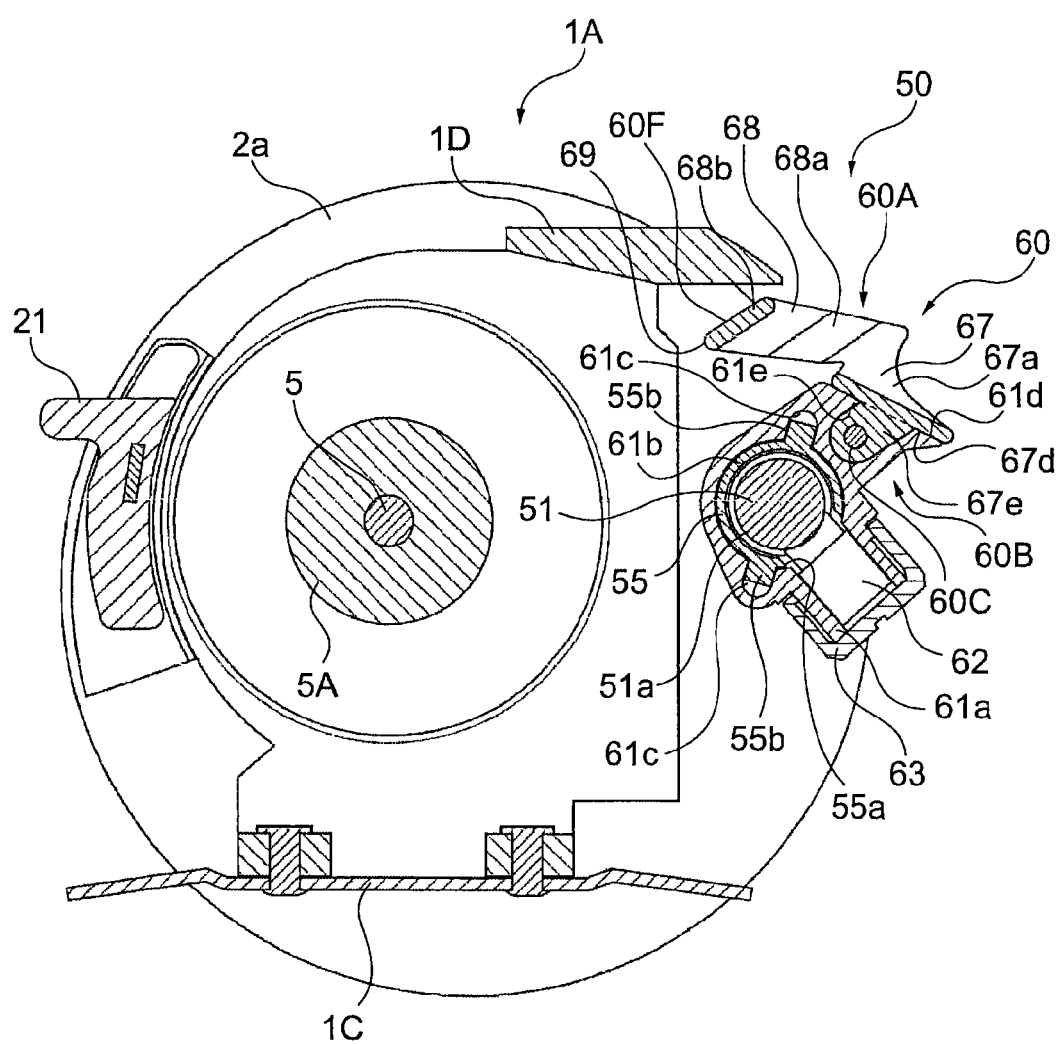
FIG. 5 is a cross-sectional view of the fishing reel illustrated in FIG. 1 taken along a line A-A, illustrating a case where the fishing line guide body is in a fishing line winding state (clutch ON state)
Figure 6:
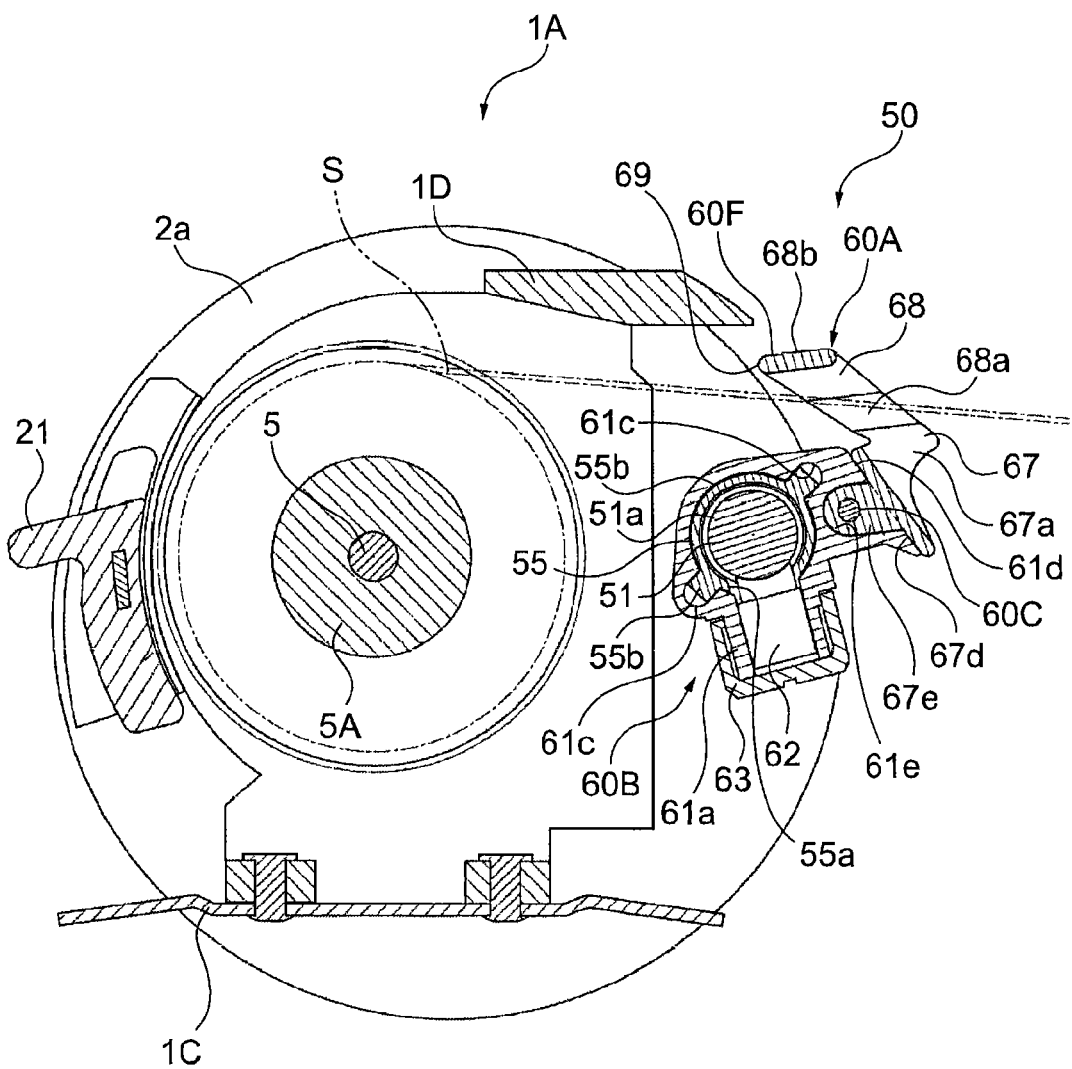
FIG. 6 is another cross-sectional view of the fishing reel illustrated in FIG. 1 taken along the line A-A, illustrating a case where the fishing line guide body is in a fishing line unwinding state (clutch OFF state)
Figure 7:
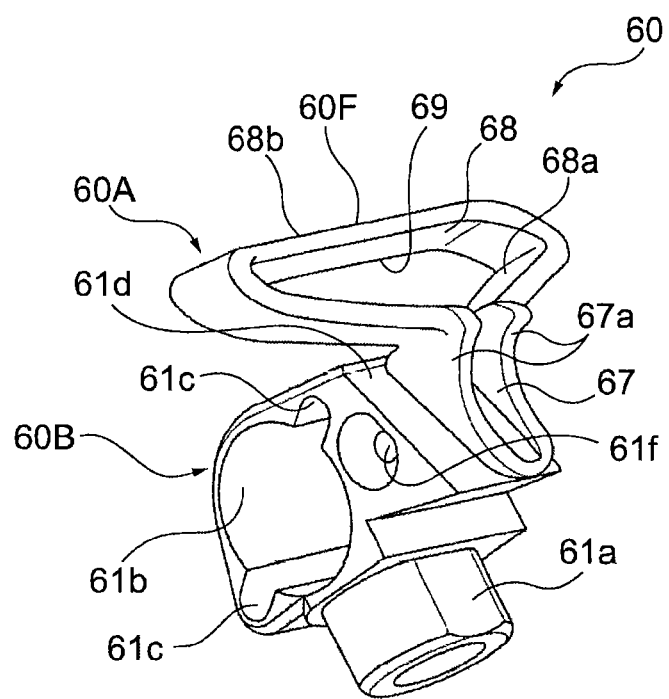
FIG. 7 is an enlarged perspective view of the fishing line guide body.
Figure 8:
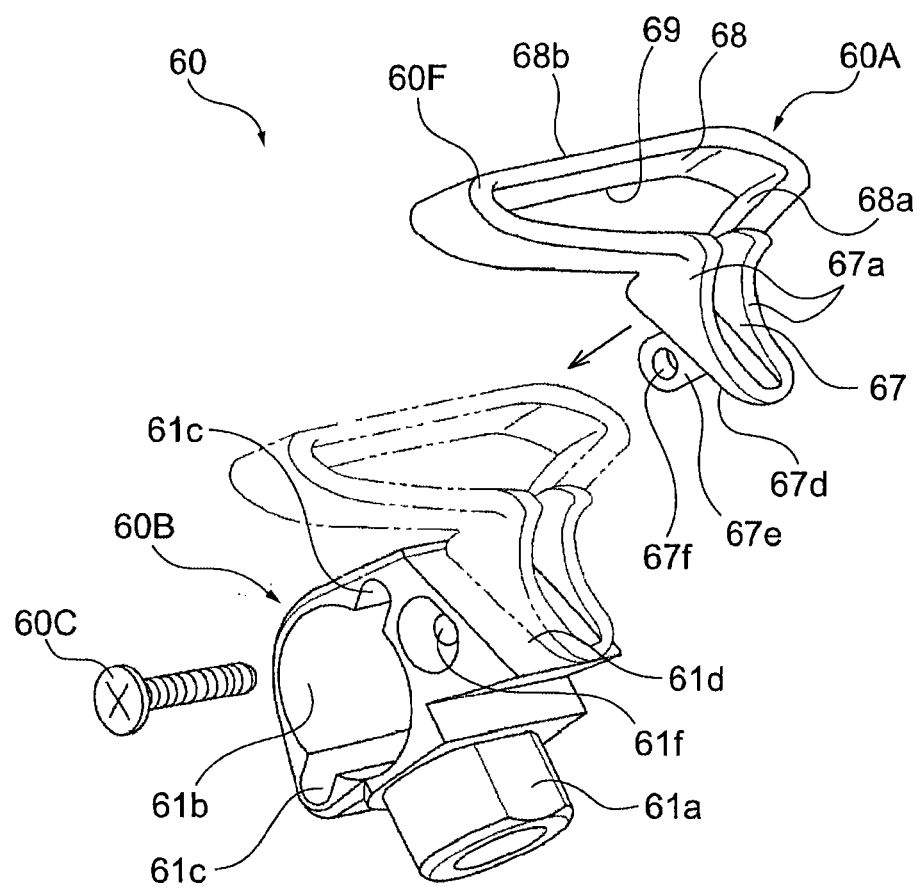
FIG. 8 is an exploded perspective view of the fishing line guide body illustrated in FIG. 7.
Figure 9:
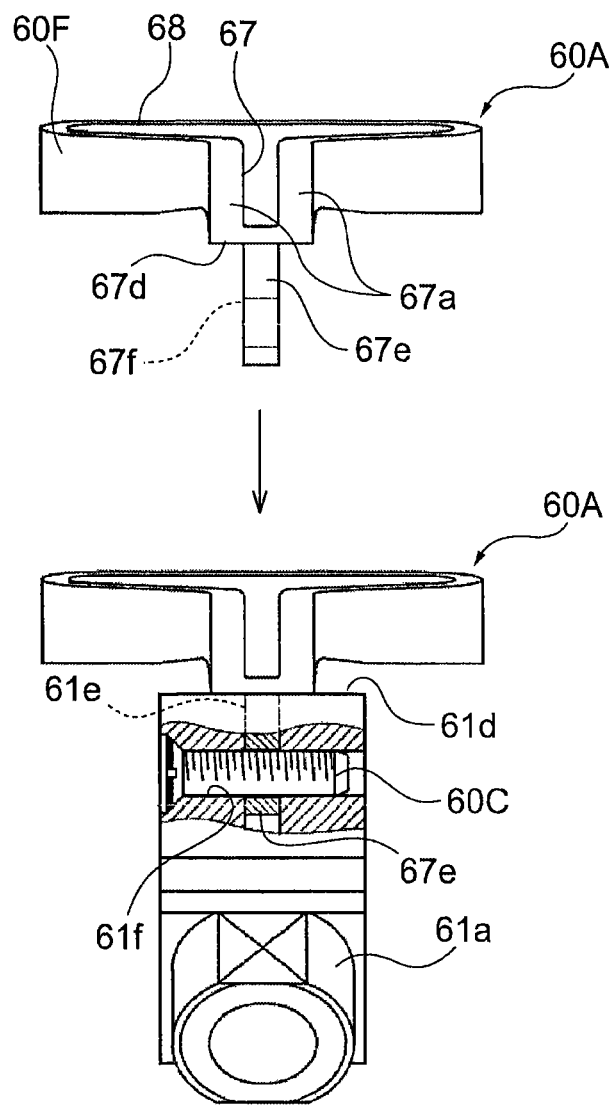
FIG. 9 is a partial cross-sectional front view of the fishing line guide body illustrated in FIG. 8.
Figure 10:
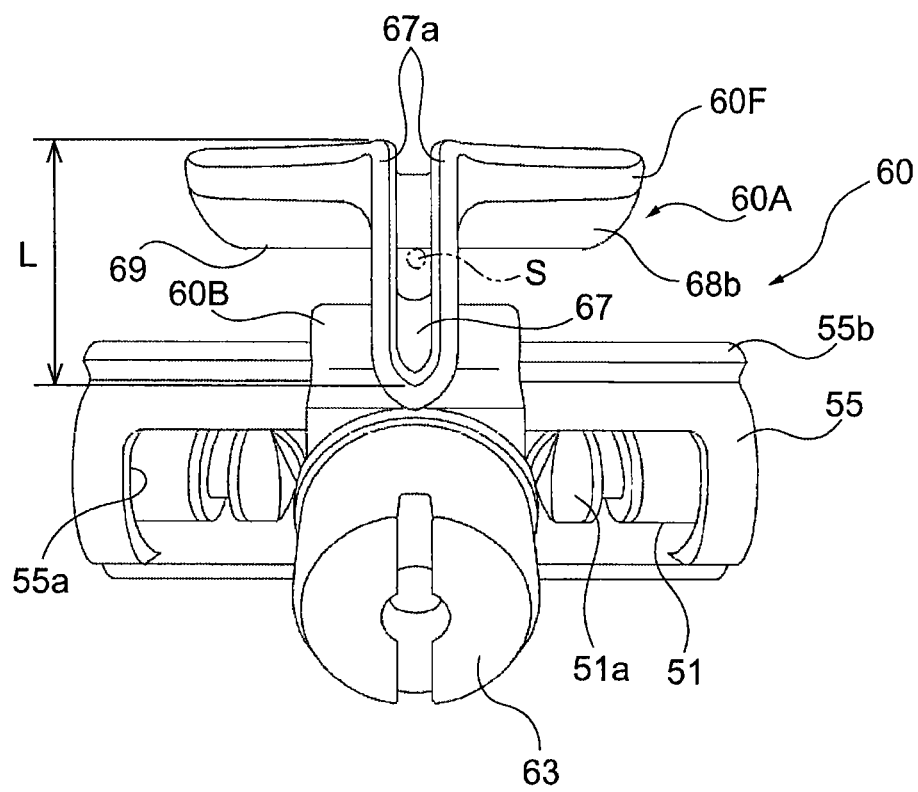
FIG. 10 is a front view illustrating a case where the fishing line guide body illustrated in FIG. 7 is in the fishing line winding state.

The level wind device 50 is disposed between the left and right side plates in front of the spool 5A. The structure of the level wind device 50 will be described below with reference to all of FIGS. 4 to 10. Meanwhile, in regard to these drawings, FIG. 4 is a cross-sectional view illustrating the structure of a connected portion between the clutch plate and a rotary plate that rotates the fishing line guide body; FIG. 5 is a cross-sectional view of the fishing reel illustrated in FIG. 1 taken along a line A-A, illustrating a case where the fishing line guide body is in a fishing line winding state (clutch ON state); FIG. 6 is a diagram illustrating a case where the fishing line guide body is in a fishing line unwinding state (clutch OFF state); FIG. 7 is an enlarged perspective view of the fishing line guide body; FIG. 8 is an exploded perspective view of the fishing line guide body illustrated in FIG. 7; FIG. 9 is a partial cross-sectional front view of the fishing line guide body illustrated in FIG. 8; and FIG. 10 is a front view illustrating a case where the fishing line guide body illustrated in FIG. 7 is in the fishing line winding state.

The level wind device 50 is provided with the fishing line guide body 60 through which a fishing line S wound on the spool 5A is threaded. The fishing line guide body 60 is rotatably supported between the left and right side plates via a bearing 52 (see FIG. 4), and is reciprocated in the left and right direction by a worm shaft (screw shaft) 51 that is rotatably driven via the drive force transmission mechanism 10. That is, an input gear 53, which is disposed adjacent to the drive gear 11 mounted on the handle shaft 8a and is engaged with a connection gear (not illustrated) rotating integrally with the handle shaft 8a, is provided on the right frame side of the worm shaft 51. The worm shaft 51 is rotationally driven in synchronization with the rotational drive of the handle 8 via the connection gear and the input gear 53.

The worm shaft 51 is housed in a tubular body (cylindrical body) 55 that is rotatably held between the left and right side plates. A long hole 55a, which extends in the axial direction, is formed on an outer surface of the tubular body 55, and a spiral groove 51a formed on the surface of the worm shaft 51 is partially exposed to the outside in the axial direction. Further, the fishing line guide body 60 through which the fishing line S is threaded includes a fishing line threading section 60A and a main body 60B that are formed integrally. A fishing line is threaded through the fishing line threading section 60A, and the main body 60B is disposed and formed so as to surround the tubular body 55.

The main body 60B is integrally formed and made of a material, which allows weight to be reduced, for example, a resin material, and holds the slidable member 62 in a protruding portion 61a that is formed so as to protrude forward. The slidable member 62 is fixed to the main body 60B by a cap nut 63 that is fitted to the protruding portion 61a. Further, an insertion hole 61b is formed at the main body 60B and the tubular body 55 is inserted into the insertion hole 61b, so that the slidable member 62 is engaged with the spiral groove 51a through the long hole 55a of the tubular body 55. That is, the fishing line guide body 60 can be moved in the axial direction with the rotation of the worm shaft 51 by means of the engagement relationship between the spiral groove 51a and the slidable member 62.

Furthermore, the fishing line guide body 60 is prevented from rotating about the tubular body 55 while being moved in the axial direction by means of the engagement relationship between the spiral groove 51a and the slidable member 62 when the worm shaft 51 is rotated. In the structure of this embodiment, rotation stoppers 55b extending in the axial direction are formed on an outer periphery of the tubular body 55, and rotation is stopped through the engagement between engagement sections 61c, which are formed integrally with the main body 60B, and the rotation stoppers 55b. Specifically, the rotation stoppers 55b are formed as protrusions that are formed on the outer periphery of the tubular body 55 so as to extend in the axial direction (a pair of protrusions are provided at an interval of 180° as illustrated in FIGS. 5 and 6), and the engagement sections 61c are formed as a pair of recesses that extend along the insertion hole 61b and are provided at an interval of 180° so that the protrusions are fitted to the recesses.

As described above, since the rotation stoppers 55b are formed integrally with the tubular body 55 housing the worm shaft 51, it is not necessary to provide a guide shaft for stopping the rotation of the fishing line guide body 60 as in the related art. As a result, the structure of the level wind device can be simplified.

Further, when the worm shaft 51 is rotationally driven, the fishing line guide body 60 is driven so as to reciprocate between the left and right side plates via the slidable member 62. In this embodiment, the fishing line guide body 60 is supported so as to be switchable between the fishing line winding state and the fishing line unwinding state in conjunction with the ON/OFF state of the above-mentioned clutch mechanism 20. Specifically, the fishing line guide body 60 is supported in front of the spool 5A by the tubular body 55 so as to be rotatable in the front and rear direction, and the fishing line guide body 60 is rotated between the fishing line winding state and the fishing line unwinding state when the tubular body 55 is rotationally driven.

Here, a power transmission path from the clutch mechanism 20 to the tubular body 55 will be described specifically.

A protruding piece 25b protruding to the front side of the reel body is formed on the clutch plate 25, and an engagement protrusion 25c, which protrudes toward the right frame side, is formed integrally with the tip of the protruding piece 25b. On the other hand, a rotary plate 59 is held at a portion, which supports the worm shaft 51, of the right frame 2b, and the tubular body 55 is unrotatably fixed to the rotary plate 59 on the inner surface side of the right frame 2b. That is, protrusions 59a, which protrude in a radial direction, are formed on the rotary plate 59 and recesses 55c, which are formed at an end portion of the tubular body 55, are fitted to the protrusions 59a. Accordingly, both the protrusion 59a and the recess 55c are fixed to each other (rotatable integrally with each other) on the inner surface side of the right frame 2b.

The rotary plate 59 is rotatably supported between the right frame 2b and an outer ring of the bearing 52 that rotatably supports the worm shaft 51. A connecting piece 59b, which is engaged with the protruding piece 25b of the clutch plate 25, is formed on the rotary plate 59 along an outer surface of the right frame 2b. Further, a long hole 59c is formed on the connecting piece 59b, and the engagement protrusion 25c of the protruding piece 25b of the clutch plate 25 is loosely inserted into the long hole 59c. As a result, the rotary plate 59 is rotated about the axis of the worm shaft 51 along with the rotation of the clutch plate 25 as illustrated in FIGS. 2 and 3. Therefore, the rotary plate 59 is switched between two positions together with the clutch plate 25 that is switched and held between the fishing line winding state and the fishing line unwinding state by the switching spring 23.

The tubular body 55 is rotationally driven through the rotary plate 59, so that the fishing line guide body 60 is rotationally driven in the front and rear direction in front of the spool. Here, the structure of the fishing line threading section 60A of the fishing line guide body 60 will be described specifically.

The fishing line threading section 60A is a portion through which the fishing line S to be unwound from the spool 5A is threaded, and is integrally formed as a frame body 60F made of a material having small resistance against a fishing line, such as SUS or titanium. Specifically, the fishing line threading section 60A of this embodiment includes a fishing line guide section 67 that is narrow in the left and right direction and a wide opening portion 68 that is provided at the upper portion of the fishing line guide section 67 and expands in the left and right direction so as to be substantially symmetric. The fishing line guide section 67 is formed in the shape of a narrow groove, which extends in the vertical direction, by both walls 67a that extend downward from a lower middle position of the opening portion 68.

That is, the fishing line guide section 67, which is formed at a lower middle portion of the opening portion 68 and is narrow in the left and right direction, has a function to stably wind the fishing line on the spool 5A in parallel (a function to improve the spooled condition) by preventing the deviation of the fishing line S, which is threaded through the fishing line guide section, in the left and right direction. The wide opening portion 68, which is formed at an upper portion of the fishing line guide section 67 and expands in the left and right direction, has a function to reduce resistance against a line (a function to improve the release of a terminal tackle) by suppressing the contact between the fishing line and itself during the unwinding of the fishing line.

The opening portion 68 is formed in a substantially oval shape expanding in the left and right direction in front view (front view seen from the front side along the fishing line S to be threaded) when the fishing line guide body is in the fishing line unwinding state. Both side walls of the opening portion 68 are formed of inclined guide surfaces 68a that are inclined toward the fishing line guide section 67 formed at the substantially lower middle portion of the opening portion 68 and guide the fishing line S.

The frame body 60F, which includes the opening portion 68 and the fishing line guide section 67, is inclined with respect to the front and rear direction (in a shape in which the frame body gradually rises toward the rear side) in side view when the fishing line guide body is in the fishing line unwinding state, and an upper wall 68b forming the opening portion 68 is parallel to the front and rear direction in the fishing line unwinding state. Accordingly, it is possible to obtain an opening as large as possible (see FIG. 6). Therefore, a rear end edge 69 of the upper wall 68b, which forms the opening portion 68 and is parallel to the front and rear direction, is positioned so as to come into contact with the fishing line S, which is threaded the opening portion 68, from above when the fishing line guide body is rotated to the fishing line winding state from the fishing line unwinding state. For this reason, the rear end edge 69 has a function as a regulator that regulates the fishing line S (hereinafter, the rear end edge is referred to as a regulator 69).

Meanwhile, the regulator 69 is a portion that is integrally formed as the frame body 60F, and may have a positional relationship so as to be within a range L of the vertical length of the fishing line guide section 67 in front view when the fishing line guide body 60 is rotated to the fishing line winding state from the fishing line unwinding state in conjunction with the clutch mechanism 20 (see FIG. 10). That is, according to this positional relationship, when the fishing line guide body 60 is rotated to the fishing line winding state from the fishing line unwinding state, the fishing line S positioned at any portion in the opening portion 68 is pressed by the regulator 69 and can be reliably guided to the fishing line guide section 67 along the inclined guide surface 68a. Further, according to this positional relationship, it is possible to reliably prevent the fishing line S from deviating from the fishing line guide section 67 in the fishing line winding state.

As described above, the main body 60B is integrally formed and made of a resin material or the like and is formed separately from the frame body 60F. That is, the frame body 60F (the fishing line threading section 60A) and the main body 60B, which are made of different materials, of the fishing line guide body 60 are formed separately and integrated with each other. Accordingly, the fishing line guide body 60 is reduced in cost while being reduced in weight as a whole.

The main body 60B and the fishing line threading section 60A may be formed separately and integrated with each other (integrated with each other by adhesion or the like). However, the main body 60B and the fishing line threading section 60A are detachably integrated with each other in this embodiment. Specifically, a receiving portion 61d, which receives the frame body, is formed at the main body 60B, and a contact portion 67d, which is positioned by coming into contact with the receiving portion 61d, is formed at the fishing line threading section 60A (the frame body 60F). In this case, the contact portion 67d is formed of lower surfaces of both the walls 67a that define the fishing line guide section 67, and the receiving portion 61d is formed of a surface that comes into contact with the lower surfaces. Accordingly, both the contact portion 67d and the receiving portion 61d are formed of flat surfaces that come into surface contact with each other. Further, a fitting hole 61e is formed at the receiving portion 61d, and an engagement protrusion 67e to be fitted to the fitting hole 61e is formed at the contact portion 67d. Furthermore, a screw hole 61f is formed at the main body 60B so as to be parallel to the insertion hole 61b, and a screw hole 67f is formed at the engagement protrusion 67e so as to be coaxial with the screw hole 61f when the engagement protrusion 67e is fitted to the fitting hole 61e.

Accordingly, when a fixing member (screw) 60C is tightened while the engagement protrusion 67e of the fishing line threading section 60A is fitted to the fitting hole 61e of the main body 60B (see arrows of FIGS. 8 and 9) and the contact portion 67d and the receiving portion 61d are positioned by coming into contact with each other, the fishing line threading section 60A and the main body 60B are detachably integrated with each other. That is, the fishing line threading section 60A of this embodiment can be easily mounted on and detached from the main body 60B.

Next, the function and the effect of the fishing reel formed as described above will be described.

When the operation member 21 positioned in the rear of the spool 5A is pushed down in the clutch ON state illustrated in FIGS. 2 and 5, the clutch plate 25 forming the clutch mechanism 20 is rotated counterclockwise and held in the state illustrated in FIG. 3 by the switching spring 23. At this point, the cam face 26 formed on the surface of the clutch plate 25 shifts the yoke 22 in the axial direction and disengages the pinion 12 from the spool shaft 5 (clutch OFF state). Further, the rotary plate 59 is rotated about the axis of the worm shaft 51 in conjunction with the rotation of the clutch plate 25 that is caused by this operation, and the tubular body 55 unrotatably fixed to the rotary plate 59 is rotated to the position illustrated in FIG. 3 (FIG. 6) from the position illustrated in FIG. 2 (FIG. 5).

Therefore, since the fishing line guide body 60 is held by the tubular body 55, the fishing line guide body 60 is rotated as illustrated in FIG. 6 from the state illustrated in FIG. 5. Then, the fishing line guide body 60 rotated as described above is in a state in which the spool 5A can be freely rotated (fishing line unwinding state), and the fishing line S threaded through the fishing line guide section 67 is released from the regulation of the regulator 69 and moves to the opening portion 68. Since the amount of the fishing line wound on the spool 5A is usually large in the fishing line unwinding state, the fishing line can immediately move to the opening portion 68 when the regulation of the regulator 69 is released.

Since the spool 5A can be freely rotated in this state, the fishing line S is unwound by a casting operation or the like. In this case, the fishing line guide body 60 is rotated in front of the spool 5A in the state illustrated in FIG. 6, and the opening portion 68 is formed so as to be wide in the left and right direction. Accordingly, contact resistance is less applied to the fishing line from the inner surface of the opening portion 68, so that the flying distance of a terminal tackle is not reduced. That is, it is possible to reduce unwinding resistance that is applied from the fishing line guide body 60 when the fishing line is unwound.

Further, when the handle 8 is operated for winding in order to return the clutch mechanism 20 to the ON state, the clutch plate 25 is automatically returned to the position illustrated in FIG. 2 by the automatic return mechanism 30. In response to the return of the clutch plate 25 to the ON state, the tubular body 55 is rotated to the state illustrated in FIGS. 2 and 5 via the rotary plate 59, and the fishing line guide body 60 is switched to the position illustrated in FIG.

5. At this time, the regulator 69 to be rotated comes into contact with and is pressed against the fishing line that is positioned at any portion in the opening portion 68, and the fishing line is reliably guided to the fishing line guide section 67, which is positioned in the middle, along the inclined guide surface 68a of the opening portion 68. Further, in the fishing line winding state, the deviation of the fishing line from the fishing line guide section 67 is prevented by the regulator 69.

After that, when the handle 8 is operated for winding, the worm shaft 51 of the above-mentioned level wind device 50 is rotationally driven via the connection gear provided on the handle shaft 8a and the input gear 53 engaged with the connection gear. When the worm shaft 51 is rotationally driven, the fishing line guide body 60 is reciprocated in the left and right direction along the tubular body 55 via the slidable member 62 that is engaged with the spiral groove 51a formed on the outer peripheral surface of the worm shaft 51. In this case, since the rotation stoppers 55b extending in the axial direction are formed on the outer periphery of the tubular body 55, the fishing line guide body 60 is driven so as to reciprocate in the left and right direction without rotating about the shaft. Accordingly, the fishing line S is stably wound on the spool 5A in parallel by the fishing line guide section 67 that is narrow in the left and right direction, and the deviation of the fishing line S from the fishing line guide section 67 is prevented due to the position of the regulator 69. Therefore, a state in which the fishing line is continuously and stably wound in parallel is ensured.

Incidentally, when the amount of the fishing line S wound on the spool 5A is small, for example, when a large amount of the fishing line has been unwound, the fishing line S positioned in the fishing line guide section 67 does not have to come into contact with the regulator 69.

Further, the fishing line threading section 60A and the main body 60B of the above-mentioned fishing line guide body 60 are formed separately and integrated with each other. Accordingly, the fishing line threading section 60A is made of a hard material that allows resistance against the fishing line to be reduced, and the main body 60B is made of a resin material that allows weight to be reduced. That is, different materials are effectively used as the material of the fishing line guide body. Therefore, the fishing line guide body can be reduced in cost and can be reduced in weight as a whole. In particular, since the fishing line threading section 60A and the main body 60B of this embodiment are detachably integrated with each other by the fixing member (screw) 60C or the like, it is possible to easily replace only the fishing line threading section 60A in accordance with repair, the kind of the line, and the use, which is economical. Accordingly, it is possible to reduce cost.

Figure 11:
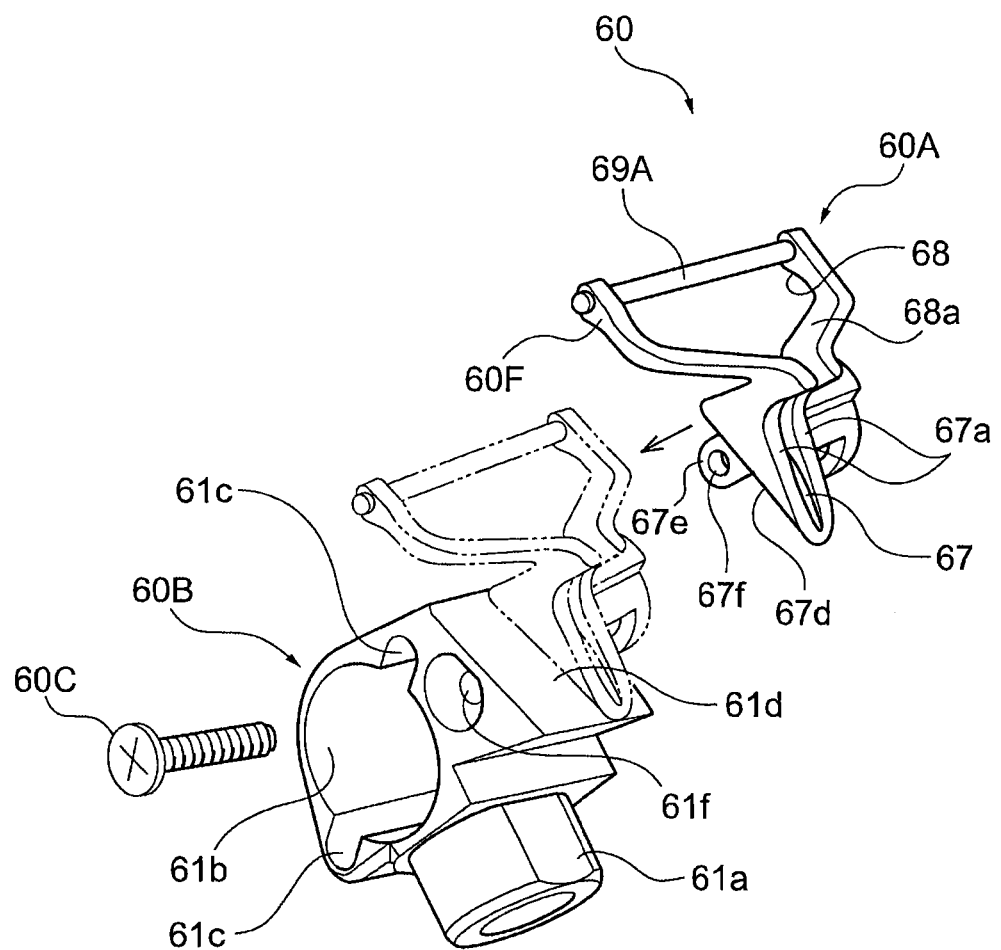
FIG. 11 is a diagram illustrating a first modification of the fishing line guide body.
Figure 12:
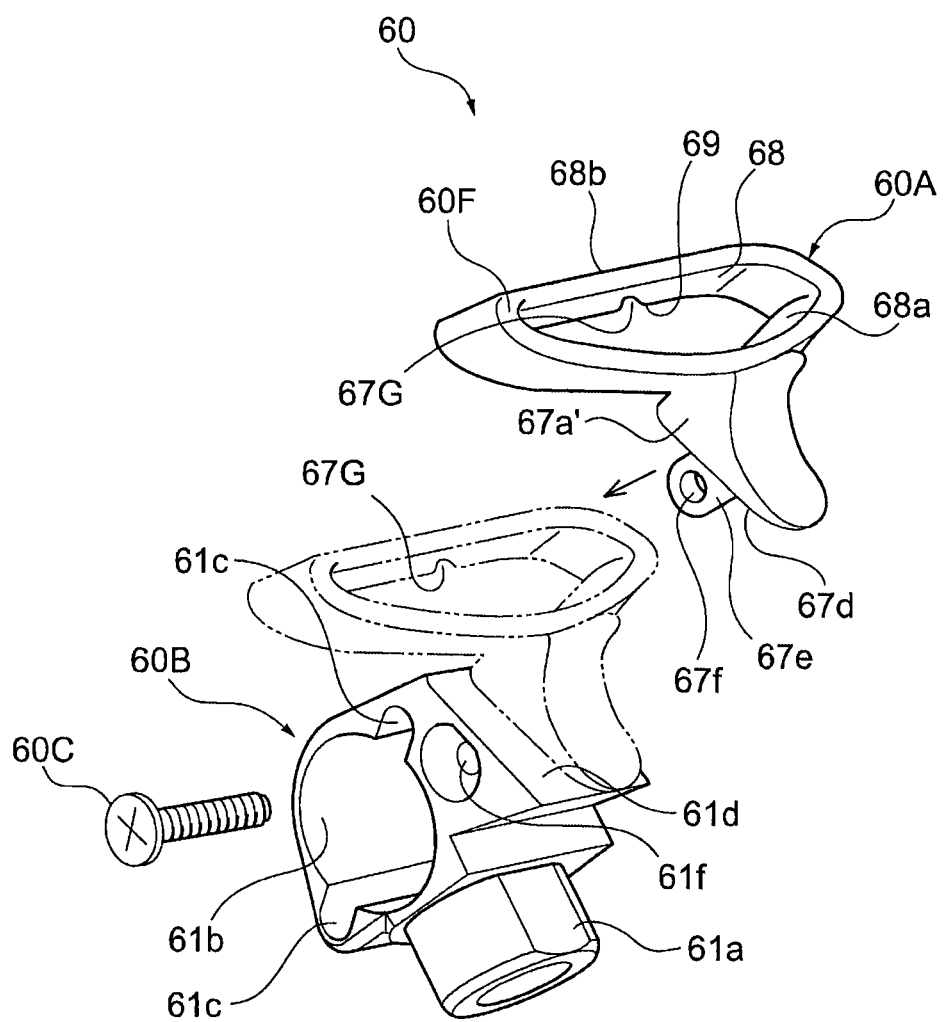
FIG. 12 is a diagram illustrating a second modification of the fishing line guide body.

The above-mentioned fishing line guide body 60 can be modified in various ways as illustrated in, for example, FIGS. 11 and 12. Here, modifications of the fishing line guide body 60 will be described with reference to FIGS. 11 and 12. Meanwhile, in the description of the modifications to be exemplified below, the same components as those of the embodiment will be denoted by the same reference numerals and the detailed description thereof will be omitted.

A modification illustrated in FIG. 11 is an example in which a regulator 69A of a fishing line threading section 60A integrated with a main body 60B is formed of a cylindrical shaft and is provided on a frame body 60F. The regulator 69A may be rotatably mounted on the frame body 60F, and may be fixed to the frame body 60F.

According to this structure, frictional resistance against a fishing line is reduced in the fishing line winding state. Accordingly, it is possible to reduce damage to the fishing line.

In a modification illustrated in FIG. 12, a narrow fishing line guide section, which guides a fishing line when the fishing line is wound, is formed at an upper portion of a wide opening portion 68 of a frame body 60F. That is, a substantially U-shaped or substantially V-shaped notch (narrow fishing line guide section) 67G is formed at a substantially middle portion of a rear end edge 69 of an upper wall 68b defining the opening portion 68 so that a fishing line is threaded through the notch. The fishing line guide section 67G is a portion through which a fishing line comes into contact with the rear end edge 69 and is threaded when the fishing line guide body 60 is rotated to the state illustrated in FIG. 5 (clutch ON state) from the state illustrated in FIG. 6 (clutch OFF state). The fishing line guide section 67G has a function to guide a fishing line when the fishing line is wound.

Since the fishing line guide section 67 described in the above-mentioned embodiment does not need to be formed in such a structure, the dimension of the opening portion 68 in the vertical direction can be increased as much as possible. Accordingly, it is possible to reduce unwinding resistance, which is applied to the fishing line, as much as possible. Meanwhile, a base portion 67a', which is used to mount the fishing line threading section 60A on the main body 60B, is formed at a lower middle portion of the opening portion 68.

As described above, the shape of the fishing line threading section 60A of the fishing line guide body 60 and the structure of the fishing line guide section, which guides a fishing line when the fishing line is wound, can be modified in various ways.

Next, a second embodiment of the invention will be described with reference to FIG. 13 to FIG. 16.

Figure 13:
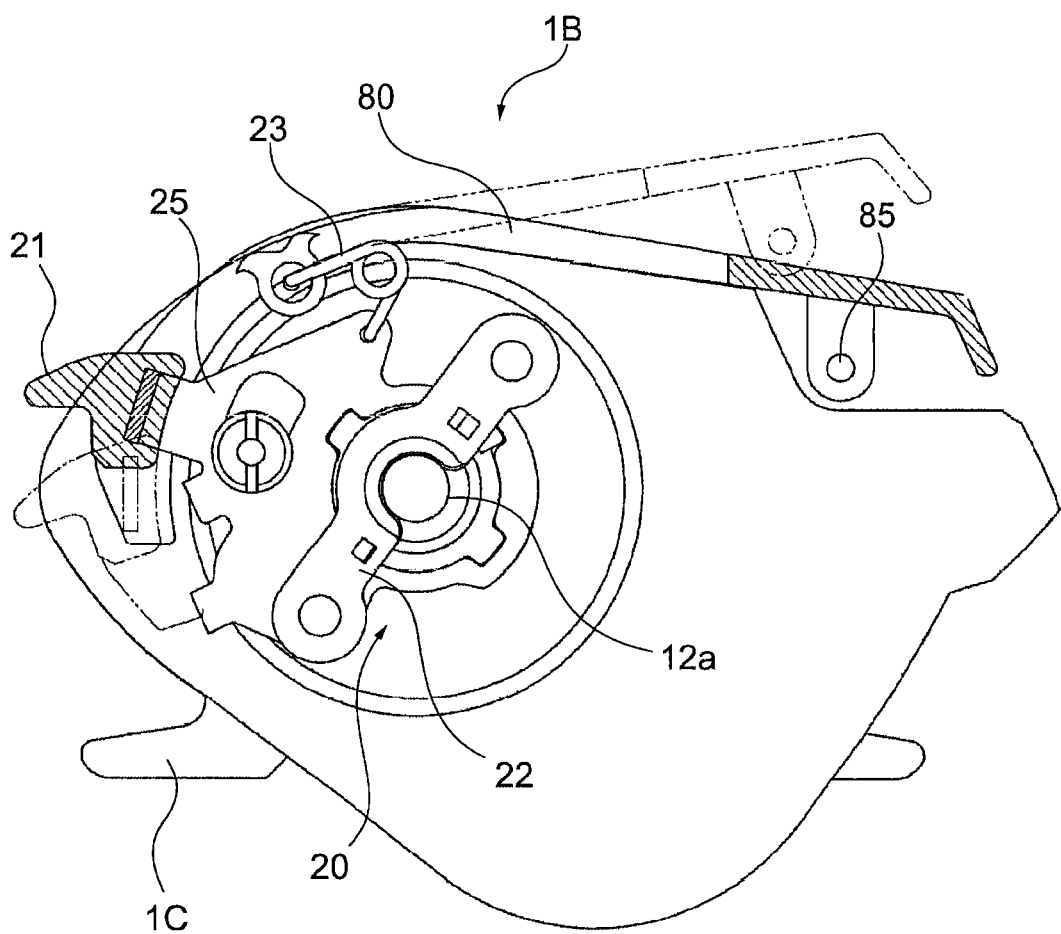
FIG. 13 is a schematic side view of a fishing reel according to a second embodiment of the invention, illustrating a relationship between a clutch mechanism and a cover provided on a reel body.
Figure 14:
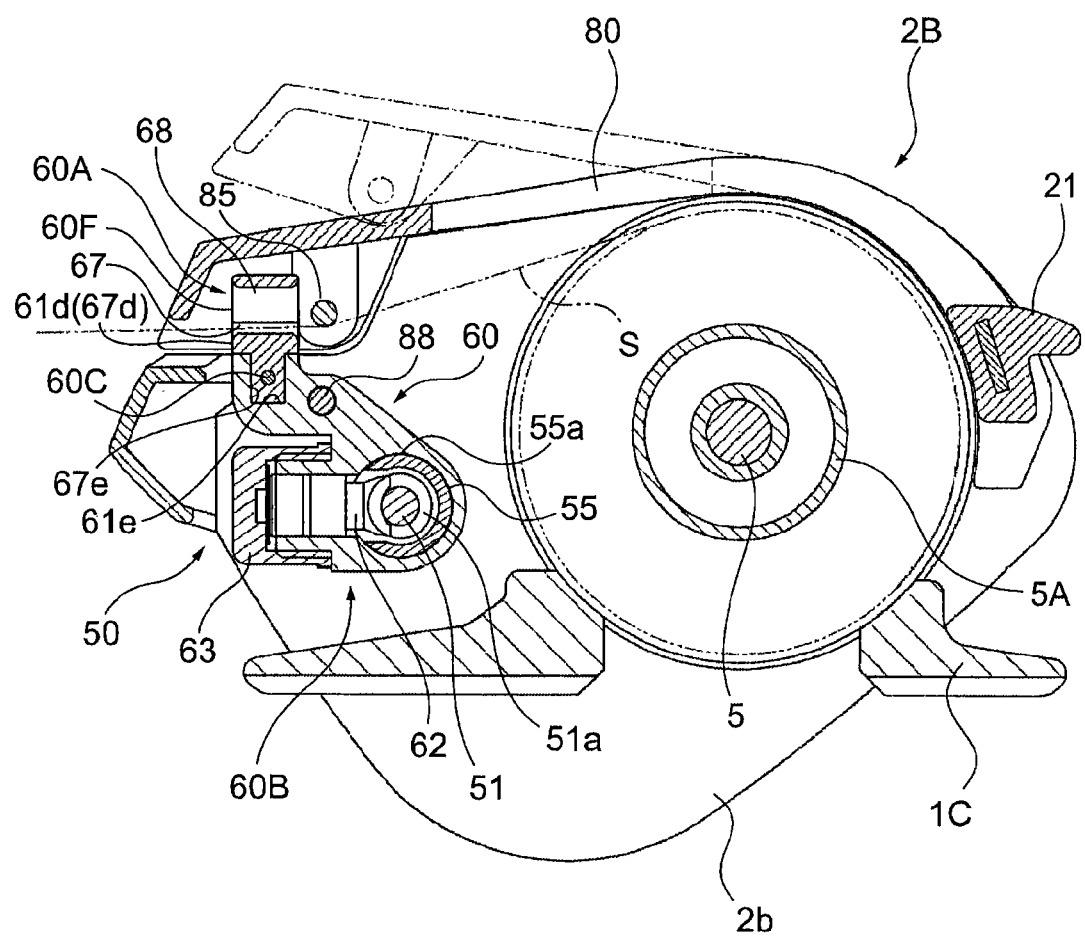
FIG. 14 is a side view illustrating a state in which a fishing line is threaded through a fishing line guide body in the fishing reel illustrated in FIG. 13 (clutch ON state)
Figure 15:
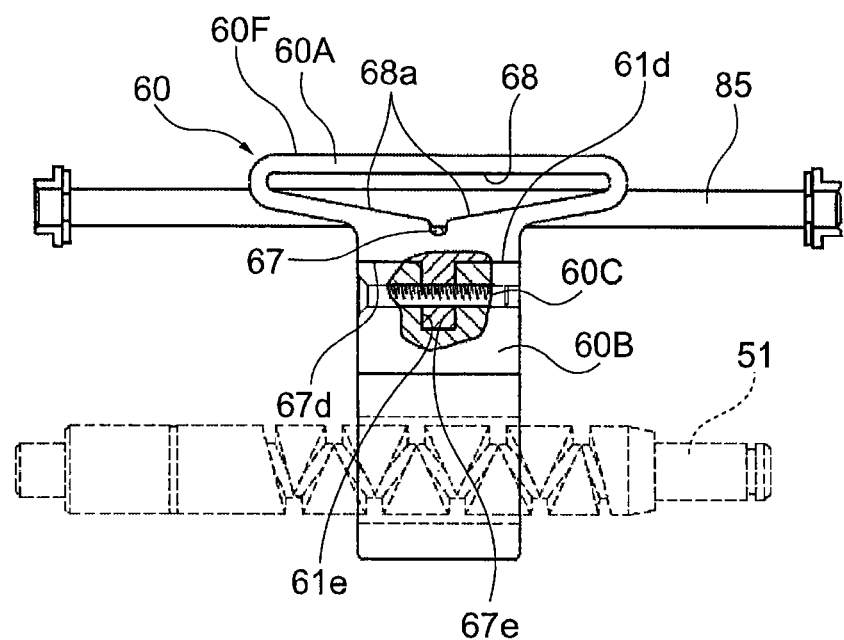
FIG. 15 is a front view of a level wind device of the fishing reel illustrated in FIG. 13 (clutch ON state)
Figure 16:
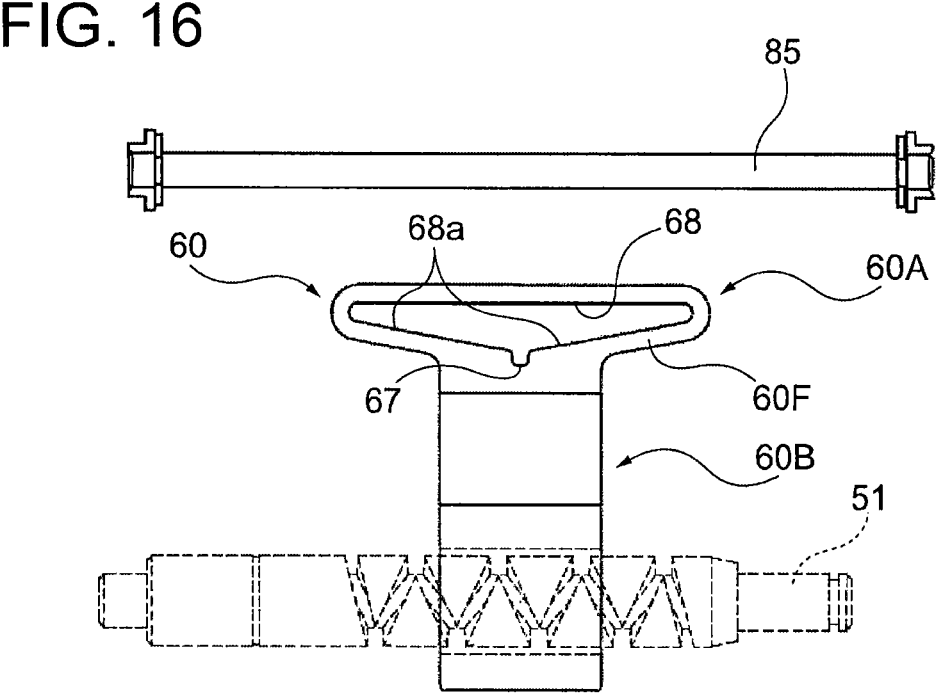
FIG. 16 is a front view of the level wind device of the fishing reel illustrated in FIG. 13 (clutch OFF state).

In regard to these drawings, FIG. 13 is a schematic side view illustrating a relationship between a clutch mechanism and a cover provided on a reel body, FIG. 14 is a side view illustrating a state in which a fishing line is threaded through a fishing line guide body in the fishing reel illustrated in FIG. 13 (clutch ON state), FIG. 15 is a front view of a level wind device of the fishing reel illustrated in FIG. 13 (clutch ON state), and FIG. 16 is a front view of the level wind device of the fishing reel illustrated in FIG. 13 (clutch OFF state). Meanwhile, members having the same functions as those of the first embodiment will be denoted by the same reference numerals and the detailed description thereof will be omitted.

In this embodiment, a cover member 80, which can be opened and closed in the vertical direction by being rotated about a rear side thereof serving as a rotation-base end portion in conjunction with the ON/OFF operation of the clutch mechanism 20, is provided at an upper portion of a reel body 1. The cover member 80 can be formed integrally with an operation member 21 of the clutch mechanism 20, and can be switched to the clutch ON state, which is illustrated by a solid line of FIGS. 13 and 14, and the clutch OFF state, which is illustrated by a chain line, by a switching spring 23 that is provided between a clutch plate 25 and a frame of the reel body. That is, the cover member 80 is provided at the upper portion of the reel body 1 and functions as a thumb rest, and a portion of the cover member 80 close to the fishing line guide body 60 is moved up and the cover member 80 is opened widely when the operation member 21 is pushed down. Accordingly, it is possible to reduce contact resistance against a fishing line that is to be unwound from the spool 5A.

The rotation of the fishing line guide body 60 of the level wind device 50 is stopped by a guide shaft 88 that is laterally laid between the left and right side plates, and the fishing line guide body 60 is supported so as to reciprocate in the left and right direction without being rotationally driven. The fishing line threading section 60A and the main body 60B of the fishing line guide body 60 are detachably integrated with each other by the same detachable structure as the above-mentioned embodiment. That is, the fishing line threading section 60A is integrally formed as a frame body 60F made of a material having small resistance against a fishing line, such as SUS or titanium; and the main body 60B is integrally formed and made of a resin material that allows weight to be reduced. Further, as in the above-mentioned embodiment, the fishing line threading section 60A includes a fishing line guide section 67 that is narrow in the left and right direction and a wide opening portion 68 that is provided at the upper portion of the fishing line guide section 67 and expands in the left and right direction so as to be substantially symmetric. The fishing line guide section 67 is formed in the shape of a groove at a lower middle position of the opening portion 68.

Furthermore, a contact member (pillar) 85, which is laterally laid in the left and right direction, is provided on the back side of the cover member 80. The contact member 85 has a function to position a fishing line S in the fishing line guide section 67 by coming into contact with the fishing line to be unreeled from the spool 5A as illustrated in FIG. 14 when the cover member 80 is in the clutch ON state. That is, in the clutch OFF state, the front portion of the cover member 80 is opened widely and the fishing line S is released from the regulation of the contact member 85 (see FIG. 16) and moves to the opening portion 68 that is wide in the left and right direction. Accordingly, resistance during the unwinding of the fishing line is reduced. Further, in the clutch ON state, the front portion of the cover member 80 is closed and the fishing line S is regulated by the contact member 85 (see FIG. 15) and moves to the fishing line guide section 67 along the inclined guide surface 68a of the opening portion 68 that is wide in the left and right direction. Accordingly, a state in which the fishing line is wound on the spool 5A is stabilized.

According to this structure, the same function and effect as the above-mentioned embodiment are obtained, and the reel body can be low-profiled.

Meanwhile, in this embodiment, the contact member 85 is provided on the cover member 80 that can be opened and closed and is adapted to come into contact with the fishing line in the clutch ON state. However, the contact member 85 may be adapted to independently move up and down. That is, a contact member, which moves up and down in conjunction with the clutch mechanism, may be provided without the cover member 80 that can be opened and closed.

The embodiments of the invention have been described above, but the invention is not limited thereto and may have various modifications.

The fishing line guide section 67 has been formed at the lower middle portion of the opening portion 68 in the above-mentioned first embodiment. However, the fishing line guide section 67 may not be formed to continue to the opening portion 68 at the position where the fishing line guide section 67 is formed, and the shape of the fishing line guide section 67 can also be appropriately modified.

Further, in a case where the fishing line guide body 60 is rotationally driven in the front and rear direction in front of the spool 5A, the regulator 69 is not necessarily formed at the rear end edge of the upper wall 68b of the frame body 60F, which is formed flat, since a distance between the fishing line and the rotary axis (the center of the worm shaft 51) or a downward shifting distance of the fishing line according to the rotation angle of the tubular body 55 can be appropriately adjusted. That is, the shape of the regulator may be appropriately modified, for example, any portion of the frame body 60F forming the fishing line threading section 60A may be formed to be bent.

Further, in a case where the fishing line threading section 60A and the main body 60B are adapted to be attached to and detached from each other, the detachable structure may be appropriately modified. In the above-mentioned first embodiment, the receiving portion 61d of the main body 60B and the contact portion 67d of the fishing line threading section 60A have been formed of flat surfaces. However, for example, the receiving portion 61d and the contact portion 67d may be formed in an uneven shape, and may be integrated with each other or press-fitted to each other while any one of them is elastically deformed. According to this structure, a screw or the like does not need to be used and an attaching/detaching operation can be easily performed.

Furthermore, a member (fishing line-contact member), which has wear resistance and low slide resistance, may be mounted on a portion of the fishing line threading section that comes into contact with a fishing line. When such a fishing line-contact member is mounted, it is possible to prevent a fishing line from being cut and to further reduce contact resistance even though the fishing line comes into contact with the fishing line-contact member during the unwinding of the fishing line or during the winding of the fishing line.

EXPLANATIONS OF LETTERS OR NUMERALS

1: reel body
1A, 1B: left and right side plates
5: spool shaft
5A: spool
20: clutch mechanism
50: level wind device
55: tubular body
60: fishing line guide body
60A: fishing line threading section
60B: main body
67: fishing line guide section
68: opening portion

The invention claimed is:
1. A fishing reel comprising:
a spool that is rotatably supported between left and right side plates of a reel body;
a fishing line guide body including a fishing line threading section through which a fishing line to be unreeled from the spool is threaded and a main body engaged with a worm shaft provided between the left and right side plates, the fishing line guide body reciprocating between the left and right side plates through the rotational drive of the worm shaft; and
a clutch mechanism that switches the spool between a fishing line winding state and a fishing line unwinding state, wherein the fishing line guide body is supported in front of the spool so as to be switched and movable between the fishing line unwinding state and the fishing line winding state, the fishing line threading section and the main body are formed separately and detachably integrated with each other, a contact portion of the fishing line threading section comes into contact with a receiving portion of the main body, so that an engagement protrusion extending from the contact portion is fitted into a fitting hole of the receiving portion in a direction in which the contact portion comes into contact with the receiving portion, thereby the fishing line threading section and the main body are detachably integrated with each other, wherein both the contact portion and the receiving portion are formed of flat surfaces that come into surface contact with each other in a direction in which the engagement protrusion is fitted into the fitting hole, wherein the main body includes a screw hole, wherein the engagement protrusion includes a screw hole that is coaxial with the screw hole of the main body when the engagement protrusion is fitted into the fitting hole, and wherein when a fixing member is tightened into the screw hole of the main body and into the screw hole of the engagement protrusion while the engagement protrusion is fitted into the fitting hole and the contact portion and the receiving portion are positioned by coming into contact with each other, the fishing line threading section and the main body are detachably integrated with each other.

2. The fishing reel according to claim 1, wherein the fishing line guide body is rotatably supported about the worm shaft so as to be in the fishing line winding state and the fishing line unwinding state in conjunction with an ON/OFF operation of the clutch mechanism, and the fishing line threading section includes a fishing line guide section that guides the fishing line to the spool in the fishing line winding state and is narrow in a left and right direction, and an opening portion that reduces unwinding resistance applied to the fishing line in the fishing line unwinding state and is wide in the left and right direction.

3. The fishing reel according to claim 2, wherein the narrow fishing line guide section is formed so as to extend downward from a lower middle position of the wide opening portion, and a regulator, which prevents the fishing line from deviating from the narrow fishing line guide section by coming into contact with the fishing line when the clutch mechanism is switched to an ON state from an OFF state and the fishing line guide body is rotated, is formed at the fishing line guide body.

4. A fishing reel comprising:

a spool that is rotatably supported between left and right side plates of a reel body;

a fishing line guide body including a fishing line threading section through which a fishing line to be unreeled from the spool is threaded and a main body engaged with a worm shaft provided between the left and right side plates, the fishing line guide body reciprocating between the left and right side plates through the rotational drive of the worm shaft; and a clutch mechanism that switches the spool between a fishing line winding state and a fishing line unwinding state, wherein the fishing line threading section is detachably integrated with the main body, the fishing line threading section includes a fishing line guide section that guides the fishing line to the spool in the fishing line winding state and is narrow in a left and right direction, and an opening portion that reduces unwinding resistance applied to the fishing line in the fishing line unwinding state and is wide in the left and right direction, and the reel body is provided with a contact member that moves so as to prevent the fishing line from deviating from the fishing line guide section by coming into contact with the fishing line when the clutch mechanism is turned on.

5. The fishing reel according to claim 4, wherein a cover member, which is openable/closable in a vertical direction in conjunction with an ON/OFF operation of the clutch mechanism, is provided at an upper portion of the reel body, and the cover member is provided with the contact member.

* * * * *